United States Patent
Reddy et al.

(10) Patent No.: US 7,143,828 B2
(45) Date of Patent: Dec. 5, 2006

(54) EMULSION ADMIXTURES FOR IMPROVING CEMENT ELASTICITY

(75) Inventors: B. Raghava Reddy, Duncan, OK (US); Krishna M. Ravi, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 191 days.

(21) Appl. No.: 10/767,672

(22) Filed: Jan. 29, 2004

(65) Prior Publication Data

US 2005/0167106 A1    Aug. 4, 2005

(51) Int. Cl.
*E21B 33/138*    (2006.01)

(52) U.S. Cl. .................... 166/294; 166/300
(58) Field of Classification Search .................. None
See application file for complete search history.

(56) References Cited

U.S. PATENT DOCUMENTS

| | | | |
|---|---|---|---|
| 4,537,918 A | 8/1985 | Parcevaux et al. | 523/130 |
| 4,767,460 A | 8/1988 | Parcevaux et al. | 106/90 |
| 5,135,577 A | 8/1992 | Brothers | 106/724 |
| 5,159,980 A | 11/1992 | Onan et al. | 166/294 |
| 5,293,938 A | 3/1994 | Onan et al. | 166/293 |
| 5,588,488 A | 12/1996 | Vijn et al. | 166/293 |
| 5,688,844 A | 11/1997 | Chatterji et al. | 524/8 |
| 5,795,924 A | 8/1998 | Chatterji et al. | 523/130 |
| 5,945,387 A | 8/1999 | Chatterji et al. | 507/224 |
| 5,964,293 A | 10/1999 | Chatterji et al. | 166/294 |
| 6,098,711 A | 8/2000 | Chatterji et al. | 166/294 |
| 6,171,386 B1 | 1/2001 | Sabins | |
| 6,184,287 B1 * | 2/2001 | Westerman | 524/814 |
| 6,234,251 B1 | 5/2001 | Chatterji et al. | 166/295 |
| 6,258,757 B1 | 7/2001 | Sweatman et al. | 507/219 |
| 6,271,181 B1 | 8/2001 | Chatterji et al. | 507/219 |
| 6,321,841 B1 | 11/2001 | Eoff et al. | 166/291 |
| 6,328,106 B1 | 12/2001 | Griffith et al. | 166/295 |
| 6,330,917 B1 | 12/2001 | Chatterji et al. | 166/295 |
| 6,350,309 B1 | 2/2002 | Chatterji et al. | 106/677 |
| 6,401,817 B1 | 6/2002 | Griffith et al. | 166/295 |
| 6,448,206 B1 | 9/2002 | Griffith et al. | 507/219 |
| 6,503,870 B1 | 1/2003 | Griffith et al. | 507/219 |
| 6,508,306 B1 | 1/2003 | Reddy et al. | 166/295 |
| 6,516,884 B1 | 2/2003 | Chatterji et al. | 166/294 |
| 6,555,507 B1 | 4/2003 | Chatterji et al. | 507/219 |
| 6,593,402 B1 | 7/2003 | Chatterji et al. | 524/7 |
| 6,641,660 B1 | 11/2003 | Chatterji et al. | 106/724 |
| 6,668,928 B1 | 12/2003 | Brothers | 166/292 |
| 6,767,867 B1 * | 7/2004 | Chatterji et al. | 507/216 |
| 2003/0092582 A1 | 5/2003 | Reddy et al. | 507/100 |

FOREIGN PATENT DOCUMENTS

| | | |
|---|---|---|
| EP | 0 816 302 A2 | 1/1998 |
| EP | 1 024 154 A2 | 8/2000 |

OTHER PUBLICATIONS

Foreign communication from a related counterpart application dated Sep. 23, 2005.

* cited by examiner

*Primary Examiner*—Zakiya W. Bates
(74) *Attorney, Agent, or Firm*—Craig W. Roddy; Haynes and Boone L.L.P.

(57) ABSTRACT

Methods and cement compositions for sealing a subterranean zone penetrated by a wellbore. The cement compositions include cementitious material, a polymer emulsion and a mixing fluid. The polymer emulsion includes at least one polar monomer and at least one elasticity enhancing monomer.

51 Claims, No Drawings

EMULSION ADMIXTURES FOR IMPROVING CEMENT ELASTICITY

CROSS-REFERENCE TO RELATED APPLICATIONS

This application is related to U.S. patent application Ser. No. 10/246,943, filed Sep. 19, 2002, entitled ELASTOMERIC ADMIXTURES FOR IMPROVING CEMENT ELASTICITY, the entire disclosure of which is hereby incorporated herein by reference.

BACKGROUND

The present embodiments relate generally to a cement composition for sealing a subterranean zone penetrated by a wellbore.

In the drilling and completion of an oil or gas well, a cement composition is often introduced in the wellbore for cementing pipe string or casing. In this process, known as "primary cementing," the cement composition is pumped into the annular space between the walls of the wellbore and the casing. The cement composition sets in the annular space, supporting and positioning the casing, and forming a substantially impermeable barrier, or cement sheath, which isolates the wellbore into subterranean zones. Thus, the undesirable migration of fluids between zones is prevented after primary cementing.

Changes in pressure or temperature in the wellbore over the life of the well can result in compromised zonal isolation. Also, activities undertaken in the wellbore, such as pressure testing, well completion operations, hydraulic fracturing, and hydrocarbon production can affect zonal isolation. Compromised zonal isolation is often evident as cracking or plastic deformation in the cement composition, or de-bonding between the cement composition and either the wellbore or the casing.

Cement compositions are made chiefly of cement. Due to its incompressible nature, neat cement is undesirable for use where there is a chance of expansion or contraction in the wellbore. Cement has a high Young's modulus, and fractures at slight strains when subjected to stresses ("brittle failure"). When the imposed stresses exceed the stress at which the cement fails, the cement sheath can no longer provide zonal isolation. To lower the Young's modulus of cement compositions, sodium silicate is added, which results in a composition having a high water to cement ratio. However, such silicate treated cement compositions ("water-extended slurries") suffer from low compressive and tensile strengths.

Therefore, a cement composition that can provide greater elasticity and compressibility, while retaining high compressive and tensile strengths, is desirable for primary cementing.

DESCRIPTION

A cement composition for sealing a subterranean zone penetrated by a wellbore according to the present embodiments comprises a mixture of at least one cementitious material ("cement"), a polymer emulsion comprising at least one polar monomer and at least one elasticity enhancing monomer, and mixing fluid in an amount sufficient to form a slurry. According to certain of the present embodiments, the polymer emulsion further comprises at least one stiffness enhancing monomer.

According to the embodiments illustrated herein, the polar monomer may be selected from vinylamine, vinyl acetate, acrylonitrile, or acid, ester, amide, or salt forms of acrylates, such as acrylic acid; and the elasticity enhancing monomer may be selected from ethylene, propylene, butadiene, 1,3-hexadiene or isoprene. In the embodiments that include a stiffness enhancing monomer, the stiffness enhancing monomer may be selected from styrene, t-butylstyrene, α-methylstyrene or sulfonated styrene.

As used herein, the term "polymer emulsion" means a water emulsion of a rubber or plastic obtained by polymerization. Such a polymer emulsion is commonly known as "latex", and the terms "polymer emulsion" and "latex" are interchangeable herein.

Polymer emulsions according to the present embodiments include from about 1 to about 90 weight percent of a polar monomer, and from about 10 to about 99 weight percent of an elasticity enhancing monomer. Thus, according to the present embodiments, a cement composition is prepared that includes a latex, which latex includes from about 1 to about 90 weight percent of a polar monomer selected from vinylamine, vinyl acetate, acrylonitrile, and acid, ester, amide or salt forms of acrylates, such as acrylic acid, and from about 10 to about 99 weight percent of an elasticity enhancing monomer selected from ethylene, propylene, butadiene, 1,3-hexadiene and isoprene. When a stiffness enhancing monomer is included in the polymer emulsion according to the present embodiments, the stiffness enhancing monomer is present in an amount up to 70 weight percent. Thus, according to the present embodiments, a cement composition is prepared that includes a latex, which latex includes from about 1 to about 90 weight percent of a polar monomer selected from vinylamine, vinyl acetate, acrylonitrile, and acid, ester, amide or salt forms of acrylates, such as acrylic acid, from about 10 to about 99 weight percent of an elasticity enhancing monomer selected from ethylene, propylene, butadiene, 1,3-hexadiene and isoprene, and up to about 70 weight percent of a stiffness enhancing monomer.

Varying the amounts of the constituents of a latex according to the present embodiments changes the properties of the latex, which affects the type and degree of properties of cement compositions that include such latex. For example, according to the present embodiments, when a latex having a high concentration of an elasticity enhancing monomer, such as butadiene, is incorporated into a cement composition, the elasticity enhancing monomer increases the elastomeric properties of the cement composition. In contrast, a latex having a high concentration of a stiffness enhancing monomer, such as styrene, or a polar monomer, such as acrylonitrile, will decrease the elastomeric properties of a cement composition. Thus, one of ordinary skill in the art will appreciate that the mechanical properties of a cement composition can be adjusted by varying the constituents of a polymer emulsion incorporated in the cement composition. As discussed further herein, the ratios of the constituents of the polymer emulsion can be varied so as to provide a method by which a cement composition incorporating such polymer emulsion can be tailored to suit conditions in a particular wellbore.

As stated above, the polymer emulsions (latexes) used in the present embodiments are water emulsions of a rubber or plastic obtained by a polymerization process. According to one embodiment, a latex is mixed with a mixing fluid, which is then mixed with at least one cementitious material to form a cement composition. According to another embodiment, the water is evaporated from a latex prepared as a water emulsion to form a dry polymer additive. The dry polymer additive is then mixed with at least one cementitious material, which is then mixed with a mixing fluid to form a cement composition.

The mixing fluid used to form cement compositions according to the present embodiments is present in an amount sufficient to yield a pumpable slurry for introduction down hole. The mixing fluid is mixed with a dry cement mix, which comprises at least one cementitious material and may further comprise additives, such as dispersing agents, accelerating agents, fluid loss agents, and other additives known to those of ordinary skill in the art. Preferably, the mixing fluid comprises water. The water used according to the present embodiments can be fresh water, unsaturated salt solution, including brines and seawater, and saturated salt solution. Generally, any type of water can be used, provided that it does not contain an excess of compounds, well known to those skilled in the art, that adversely affect the desired properties of the cement composition.

According to the present embodiments, cement compositions are prepared that comprise latex in an amount of from about 0.1 to about 30 percent by weight of a cementitious material to which the latex is added. For example, a "base" of 100% cementitious material is added to latex premixed in a mixing fluid, where the latex is mixed with the mixing fluid in an amount such that the active amount of the polymer emulsion is about 0.1 to about 30 percent by weight of the cementitious material comprising the "base." According to one embodiment, the mixing fluid comprises water in an amount of from about 30 to about 150 percent by weight of the cementitious material. According to another embodiment, the mixing fluid comprises water in an amount of from about 30 to about 70 percent by weight of the cementitious material. According to another embodiment, latex is added to a slurry comprising the "base" of cementitious material mixed with the mixing fluid. According to yet another embodiment, the latex is present in an amount of from about 2 to about 6 percent by weight of the cementitious material, and the mixing fluid comprises water in an amount of from about 30 to about 70 percent by weight of the cementitious material.

The cementitious material used with the present embodiments can be any one or more of a variety of cements, including cements comprised of calcium, aluminum, silicon, oxygen, and/or sulfur, which set and harden by reaction with water. Such hydraulic cements include Portland cements, pozzolan cements, gypsum cements, aluminous cements, silica cements, and phosphate cements. Portland cements of the type defined and described in API Specification 10, $5^{th}$ Edition, Jul. 1, 1990, of the American Petroleum Institute (the entire disclosure of which is incorporated herein by reference as if reproduced in its entirety) are preferred. API Portland cements include Classes A, C, G, and H, of which API Classes A, G, and H are particularly preferred for the present embodiments. The desired amount of cement is understandably dependent on the cementing operation.

A variety of additives may be added to one or both of the cement or the mixing fluid of a cement composition to alter the physical properties of the cement composition. Such additives may include slurry density modifying materials (e.g., silica flour, silica fume, sodium silicate, hollow glass or ceramic beads, microfine sand, iron oxides and manganese oxides), dispersing agents, set retarding agents, set accelerating agents, fluid loss control agents, strength retrogression control agents, viscosifying agents, stabilizing agents, foaming agents, foam stabilizing agents, defoaming agents and latex stabilizing surfactants, all of which are well known to those of ordinary skill in the art. Latex stabilizing surfactants are useful for stabilizing latex in slurries with high ionic strength. Such high ionic strength is often due to dissolved salt content that is inherently present in the cement slurries, or to intentional addition of salts to the slurry. Examples of latex stabilizing surfactants include ethoxylated nonylphenolsulfonates.

Thus, according to one embodiment, a cement composition comprises a mixture of at least one cementitious material, a polymer emulsion comprising at least one polar monomer and at least one elasticity enhancing monomer, a latex stabilizing surfactant, and mixing fluid. According to another embodiment, a cement composition comprises a mixture of at least one cementitious material, a polymer emulsion comprising at least one polar monomer and at least one elasticity enhancing monomer, a defoaming agent, and mixing fluid.

As will be understood by those skilled in the art, any of the polar monomer, the elasticity enhancing monomer, or the stiffness enhancing monomer comprising a polymer emulsion according to the present embodiment may be natural, modified, or synthetic.

Cement compositions prepared according to the present embodiments set under conventional curing conditions. Cement compositions prepared according to the present embodiments achieve high compressive and tensile strengths, and/or have a lower Young's modulus as compared to conventional cement compositions.

Furthermore, the present embodiments provide methods for preparing cement compositions with a desirable property or balance of properties. For example, it is understood by those of ordinary skill in the art that when higher amounts of water are used to prepare a cement composition, the Young's modulus of the cement composition will decrease. However, the higher amounts of water will also cause a decrease in the compressive and/or tensile strengths of the cement composition. For some cementing operations, lowering the Young's modulus may be more important than achieving a high compressive or tensile strength. In such a case, it would be acceptable to include a higher amount of water in the cement composition. A balance of properties must often be reached when preparing cement compositions for use in various cementing operations. The present embodiments provide methods for manipulating mechanical properties of cement compositions, such as Young's modulus, compressive strength and tensile strength, and provide methods for balancing such properties.

Further methods according to the present embodiments include preparing a cement composition having at least one cementitious material, and a polymer emulsion that includes at least one polar monomer and at least one elasticity enhancing monomer. Still further methods include placing such cement compositions into subterranean zones, and allowing the cement compositions to set therein.

The following examples are illustrative of the methods and compositions discussed above.

EXAMPLE 1

The base components, additive components, and mixing fluid components listed in TABLE 1 were mixed to form test slurries, each having a density of 14.8 pounds per gallon. The amount of each Base Component, (which in this exemplary embodiment is Class G cement), is reported in the table as a weight percent. The amount of each Additive Component, (which in this exemplary embodiment include silica flour and dry powder latex, where indicated), is reported in the table as a "% bwoc", which indicates a weight percent based on the weight of the Base Components (i.e., the Class G cement). The amount of each Mixing Fluid Component, (which in this exemplary include water, defoaming agent, and latex, where indicated), is also reported in the table as a "% bwoc".

Slurries 1–3 were prepared according to API Specification RP 10A, 23$^{rd}$ Edition, April 2002, of the American Petroleum Institute (the entire disclosure of which is incorporated herein by reference as if reproduced in its entirety). For example, Slurry No. 2 was prepared by dry-mixing the Class G cement and silica flour by hand in a glass jar. The dry-mix (also referred to as the "cement mix") was added over a 15 second period to the water, latex, and defoaming agent, which were being maintained in a Waring blender at 4000 RPM. When all of the cement mix had been added to the blender, the blender was covered and mixing was continued at about 12,000 RPM for about 35 seconds.

Slurry 3 was prepared as described above, except that the dry latex was mixed with the cement and silica flour in the glass jar, and the resulting dry-mix was then added to mixing fluid and defoaming agent in the Waring blender as described above.

The silica flour used for each slurry is commercially available from Halliburton Energy Services as SSA-1™. The defoaming agent used for each slurry comprised a polydimethylsiloxane, which is commercially available from Halliburton Energy Services as D-AIR™.

The carboxylated butadiene latex used in Slurry 2 is commercially available as TYLAC 96061™ from Dow Reichhold Specialty Latex LLC. According to the embodiments illustrated by Slurry 2, the at least one elasticity enhancing monomer comprises butadiene, and the at least one polar monomer comprises acrylic acid.

The ethylene/vinylacetate latex used in Slurry 3 is commercially available as ELVACE CPS 786™ from Dow Reichhold Specialty Latex LLC. ELVACE CPS 786™ is a dry powder form of ethylene/vinylacetate latex that is produced by first preparing the latex as a water emulsion, and then evaporating the water from the prepared latex. According to the embodiments illustrated by Slurry 3, the at least one elasticity enhancing monomer comprises ethylene and the at least one polar monomer comprises vinyl acetate.

To test each slurry for various strength parameters, a portion of each was placed into a corresponding 2"×2"×2" brass mold, and another portion of each was placed into a corresponding cylindrical plastic container provided with a lid. The molds and cylinders were cured in a 180° F. water bath for 24 hours to form samples of the set cement formed from each slurry.

Using the above-described samples, the Brazilian tensile strength, compressive strength, and Young's modulus values reported in TABLE 1 were determined.

The Brazilian tensile strength was measured by a strength-testing instrument manufactured by Tinius Olsen, Willow Grove, Pa., U.S.A., according to the American Society for Testing and Materials ASTM C 190-97 procedure (the entire disclosure of which is incorporated herein by reference as if reproduced in its entirety). Generally, however, a relatively thin disc was cut from each of the six cylinders and loaded across its diameter until it split.

The compressive strength was measured according to API Specification RP 10A, 23$^{rd}$ Edition, April 2002, of the American Petroleum Institute (the entire disclosure of which is incorporated herein by reference as if reproduced in its entirety).

The Young's modulus was determined by using MTS Load Frame equipment, available from MTS Systems Corporation, Eden Prairie, Minn., and performing load vs displacement measurements under unconfined conditions according to the operations manual for the MTS Load Frame equipment.

TABLE 1

|  | Slurry 1 | Slurry 2 | Slurry 3 |
|---|---|---|---|
| Base Components |  |  |  |
| Class G Cement (wt %) | 100 | 100 | 100 |
| Additive Components |  |  |  |
| Silica Flour (% bwoc) | 33 | 33 | 33 |
| Ethylene/Vinylacetate Latex dry powder (% bwoc) | 0 | 0 | 5 |
| Mixing Fluid Components |  |  |  |
| Water (% bwoc) | 71.6 | 62.2 | 67.4 |
| Defoaming Agent (% bwoc) | 0.09 | 0.09 | 0.09 |
| Carboxylated Butadiene Latex (% bwoc) (gal/sk) | 0 | 5 (1.1) | 0 |
| Slurry Properties |  |  |  |
| Brazilian Tensile Strength (psi) | 100 | 130 | 120 |
| Compressive Strength (psi) | 1320 | 1550 | 1290 |
| Young's modulus (psi) | 0.458E+6 | 0.654E+6 | 0.303E+6 |

TABLE 1 shows that Slurry 2, which included a polymer emulsion (latex) according to the present embodiments achieved favorable compressive strength and tensile values as compared to Slurry 1, which did not include a polymer emulsion according to the present embodiments. Furthermore, Slurry 3, which also included latex according to the present embodiments, achieved a favorable Young's modulus value as compared to Slurry 1.

TABLE 1 further shows that selection of the type of polymer emulsion affects the mechanical properties of the slurry. Slurries 1–3 each had the same density. However, the compressive and tensile strengths, and/or the Young's modulus differed for each slurry, which illustrates that the present embodiments provide methods for manipulation of the mechanical properties of set cement compositions. This illustrates that cement compositions that include polymer emulsions according to the present embodiments can be tailored to suit conditions in a particular wellbore.

EXAMPLE 2

The base components and mixing fluid components listed in TABLE 2 were mixed to form seven slurries, each having a density of 16.4 pounds per gallon. The amount of each Base Component, (which in this exemplary embodiment, is Class H cement), is reported in the table as a weight percent. The amount of each Mixing Fluid Component, (which in this exemplary embodiment are water, defoaming agent, latex stabilizing surfactant and latex), is reported in the table a "% bwoc", which indicates a weight percent based on the weight of the Base Components.

The slurries were prepared according to API Specification RP 10A, 23$^{rd}$ Edition, April 2002, of the American Petroleum Institute (the entire disclosure of which is incorporated herein by reference as if reproduced in its entirety). For example, Slurry No. 3 was prepared by adding the Class H cement over a 15 second period to the water, latex, stabilizing surfactant and defoaming agent, which were being maintained in a blender at 4000 RPM. When all of the cement had been added to the blender, the blender was covered and mixing was continued at about 12,000 RPM for about 35 seconds.

The latex stabilizing surfactant was a sulfate salt of ethoxylated nonylphenol solution (32% active) that is commercially available from Halliburton Energy Services as STABILIZER 434 B. The defoaming agent comprised a polypropylene glycol, particulate hydrophobic silica and a liquid diluent, which is commercially available from Halliburton Energy Services as D-AIR 3000 L™.

Slurry 1 did not include latex. Slurry 2 included a latex made of an elasticity enhancing monomer and a stiffness enhancing monomer, but not a polar monomer. In particular, the latex used in Slurry 2 was styrene butadiene, which is commercially available from Halliburton Energy Services as Latex 2000. Slurries 3–7 are cement compositions comprising a polymer emulsion according to the present embodiments, where the polymer emulsion (latex) comprises at least one elasticity enhancing monomer and at least one polar enhancing monomer.

The latex used for Slurry 3 was styrene butadiene acrylonitrile, which is commercially available from Dow Reichhold Specialty Latex LLC as SNAP 2042. According to the embodiment illustrated by Slurry 3, the elasticity enhancing monomer is butadiene and the polar enhancing monomer is acrylonitrile. According to this embodiment, the latex further comprises a stiffness enhancing monomer, namely, styrene.

The latex used for Slurry 4 was a butadiene acrylonitrile, which is commercially available from Dow Reichhold Specialty Latex LLC as TYLAC 68159. The latex used for Slurry 5 was another butadiene acrylonitrile, and which is commercially available from Dow Reichhold Specialty Latex LLC as AD 1049. The latex used for Slurry 6 was yet another butadiene acrylonitrile, and which is commercially available from Dow Reichhold Specialty Latex LLC as CPS 873. According to the embodiments illustrated by Slurries 4–6, the elasticity enhancing monomer comprises butadiene and the polar enhancing monomer comprises acrylonitrile. With respect to the butadiene acrylonitrile latexes used for Slurries 4, 5 and 6, the primary difference was the ratio of butadiene to acrylonitrile. The values of the specific ratios are not commercially available. However, of the three types used for Slurries 4, 5 and 6, it is known that TYLAC 68159 (Slurry 4) has the intermediate ratio of butadiene to acrylonitrile, AD 1049 (Slurry 5) has the lowest ratio of butadiene to acrylonitrile, and CPS 873 (Slurry 6) has the highest ratio of butadiene to acrylonitrile.

The latex used for Slurry 7 is vinylacetate ethylene, which is commercially available from Reichhold Corporation as ELVACE 40720. According to the embodiment illustrated by Slurry 7, the elasticity enhancing monomer comprises ethylene and the polar enhancing monomer comprises vinyl acetate.

To test each slurry for various strength parameters, a portion of each was placed into a corresponding 2"×2"×2" brass mold, and another portion of each was placed into a corresponding cylindrical plastic container provided with a lid. The molds and cylinders were cured in a 180° F. water bath for 24 hours to form set cement samples of each slurry.

Using the above-described samples, the Brazilian tensile strength, compressive strength, and Young's modulus values reported in TABLE 2 were determined.

The Brazilian tensile strength was measured by a strength-testing instrument manufactured by Tinius Olsen, Willow Grove, Pa., U.S.A., according to the American Society for Testing and Materials ASTM C190-97 procedure (the entire disclosure of which is incorporated herein by reference as if reproduced in its entirety). Generally, however, a relatively thin disc was cut from each cylinder and loaded across its diameter until it split.

The compressive strength was measured according to API Specification RP 10A, $23^{rd}$ Edition, April 2002, of the American Petroleum Institute (the entire disclosure of which is incorporated herein by reference as if reproduced in its entirety).

The Young's modulus was determined by using MTS Load Frame equipment, available from MTS Systems Corporation, Eden Prairie, Minn., and performing load vs displacement measurements under unconfined conditions according to the operations manual for the MTS Load Frame equipment.

TABLE 2

|  | Slurry 1 | Slurry 2 | Slurry 3 | Slurry 4 | Slurry 5 | Slurry 6 | Slurry 7 |
| --- | --- | --- | --- | --- | --- | --- | --- |
| Base Components |  |  |  |  |  |  |  |
| Class H cement (wt. %) | 100 | 100 | 100 | 100 | 100 | 100 | 100 |
| Mixing Fluid Components |  |  |  |  |  |  |  |
| Water (% bwoc) | 33.2 | 33.2 | 33.2 | 33.2 | 33.2 | 33.2 | 33.2 |
| Stabilizing Surfactant (% bwoc) (gal/sk) | 0 | 0.66 (0.07) | 0.66 (0.07) | 0.66 (0.07) | 0.66 (0.07) | 0.66 (0.07) | 0.66 (0.07) |
| Defoaming Agent (% bwoc) (gal/sk) | 0.17 (0.02) | 0.17 (0.02) | 0.17 (0.02) | 0.17 (0.02) | 0.17 (0.02) | 0.17 (0.02) | 0.17 (0.02) |
| Styrene butadiene (% bwoc) (gal/sk) | 0 | 2.8 (0.7) | 0 | 0 | 0 | 0 | 0 |
| Styrene-butadiene-acrylonitrile (% bwoc) (gal/sk) | 0 | 0 | 2.8 (0.71) | 0 | 0 | 0 | 0 |

TABLE 2-continued

|  | Slurry 1 | Slurry 2 | Slurry 3 | Slurry 4 | Slurry 5 | Slurry 6 | Slurry 7 |
|---|---|---|---|---|---|---|---|
| Butadiene-acrylonitrile - TYLAC 68159 ™ (% bwoc) (gal/sk) | 0 | 0 | 0 | 2.8 (0.7) | 0 | 0 | 0 |
| Butadiene acrylonitrile - AD 1049 ™ (% bwoc) (gal/sk) | 0 | 0 | 0 | 0 | 2.8 (0.74) | 0 | 0 |
| Butadiene acrylonitrile - CPS 873 ™ (% bwoc) (gal/sk) | 0 | 0 | 0 | 0 | 0 | 2.8 (0.73) | 0 |
| Vinylacetate ethylene (% bwoc) (gal/sk) | 0 | 0 | 0 | 0 | 0 | 0 | 2.8 (0.73) |
| Properties |  |  |  |  |  |  |  |
| Compressive strength (psi) | 4340 | 4240 | 5250 | 3650 | 5490 | 3110 | 2110 |
| Tensile strength (psi) | 430 | 470 | 610 | 415 | 600 | 330 | 390 |
| Elastic modulus (psi) | 1.82 | 1.32 | 1.52 | Not tested | 1.55 | Not tested | 1.2 |

TABLE 2 illustrates that slurries comprising polymer emulsions according to the present embodiments (i.e., Slurries 3–7) achieved favorable compressive and tensile strengths. Those of Slurries 3–7 that were tested for Young's modulus also achieved a lower Young's modulus than Slurry 1, which did not include latex. In particular, Slurries 3 and 5 achieved compressive and tensile strengths greater than those of Slurry 1, while also achieving a lower Young's modulus. This illustrates that cement compositions comprising polymer emulsions according to the present embodiments can be tailored to suit conditions in a particular wellbore. For example, depending on the conditions within a particular wellbore and the type of job being done, Slurry 4 may be a more suitable cement composition than Slurry 5, or Slurry 7 may be a more suitable cement composition than Slurry 3.

TABLE 2 also shows that selection of the type of polymer emulsion affects the mechanical properties of the set cement formed from each slurry. In particular, Slurries 4–6 each comprised a butadiene acrylonitrile latex having a different composition as discussed above. The different latex compositions contributed to different properties in the set cement. For example, Slurry 5 achieved greater compressive and tensile strengths than did Slurries 4 and 6, due to the presence of the elastomeric component, butadiene, in the lowest amounts. The Young's modulus values determined for exemplary Slurries 3–7 reflect the resiliency or elasticity of the cement compositions, and indicate that by proper selection of the latex composition, the elasticity of the cement composition may be improved without substantial loss in other desirable properties such as tensile strengths and compressive strengths. This further illustrates that cement compositions comprising polymer emulsions according to the present embodiments can be tailored to suit conditions in a particular wellbore.

Although only a few exemplary embodiments of this invention have been described in detail above, those skilled in the art will readily appreciate variations to above-described methods and compositions. For example, the amounts and types of additives illustrated herein, such as the silica flour, stabilizing agent, and defoaming agent can be varied. Many other modifications are possible in the exemplary embodiments without materially departing from the novel teachings and advantages of this invention. Accordingly, all such modifications are intended to be included within the scope of this invention as defined in the following claims.

The invention claimed is:

1. A method of sealing a subterranean zone comprising:
   preparing a cement composition comprising a cementitious material, polymer emulsion comprising at least one polar monomer and at least one elasticity enhancing monomer, and a mixing fluid;
   placing the cement composition into the subterranean zone; and
   allowing the cement composition to set therein, wherein the polar monomer and the elasticity enhancing monomer are present in the polymer emulsion in relative amounts effective to increase the elasticity of the set cement composition compared to a neat cement composition, while providing the set cement composition with a strength sufficient to seal the subterranean zone.

2. The method of claim 1 wherein the cement composition further comprises silica flour.

3. The method of claim 1 wherein the cementitious material is selected from the group consisting of Portland cement, pozzolan cement, gypsum cement, aluminous cement, silica cement, and phosphate cement.

4. The method of claim 1 wherein the at least one polar monomer is selected from the group consisting of vinylamine, vinyl acetate, acrylonitrile, acrylic acid, and acid, ester, amide and salt forms of acrylates.

5. The method of claim 1 wherein the at least one elasticity enhancing monomer is selected from the group consisting of ethylene, propylene, butadiene, 1,3-hexadiene and isoprene.

6. The method of claim 1 wherein the polymer emulsion comprises from about 1 to about 90 weight percent of the at least one polar monomer and from about 10 to about 99 weight percent of the at least one elasticity enhancing monomer.

7. The method of claim 1 wherein the polymer emulsion further comprises at least one stiffness enhancing monomer.

8. The method of claim 7 wherein the at least one stiffness enhancing monomer is selected from the group consisting of styrene, t-butylstyrene, α-methylstyrene and sulfonated styrene.

9. The method of claim 7 wherein the polymer emulsion comprises up to about 70 weight percent of the at least one stiffness enhancing monomer.

10. The method of claim 1 wherein the polymer emulsion is present in an amount of from about 0.1 to about 30 percent by weight of the cementitious material.

11. The method of claim 1 wherein the mixing fluid comprises water in an amount of from about 30 to about 150 percent by weight of the cementitious material.

12. The method of claim 1 wherein the polymer emulsion is present in an amount of from about 2 to about 6 percent by weight of the cementitious material and the mixing fluid comprises water in an amount of from about 30 to about 70 percent by weight of the cementitious material.

13. The method of claim 1 wherein the cement composition further comprises a polymer emulsion stabilizing surfactant.

14. The method of claim 1 wherein the cement composition further comprises a defoaming agent.

15. The method of claim 1 further comprising, prior to the preparing of the cement composition, evaporating water from the polymer emulsion such that the polymer emulsion becomes a dry polymer additive.

16. The method of claim 15 wherein the dry polymer additive is present in an amount of from about 2 to about 6 percent by weight of the cementitious material and the mixing fluid comprises water in an amount of from about 30 to about 150 percent by weight of the cementitious material.

17. A method of sealing a subterranean zone comprising:
preparing a cement composition comprising a cementitious material, a polymer emulsion comprising at least one polar monomer selected from the group consisting of vinylamine, vinyl acetate, acrylonitrile, acrylic acid and acid, ester, amide or salt forms of acrylates and at least one elasticity enhancing monomer selected from the group consisting of ethylene, propylene, butadiene, and 1,3-hexadiene and isoprene, and a mixing fluid;
placing the cement composition into the subterranean zone; and
allowing the cement composition to set therein, wherein the polar monomer and the elasticity enhancing monomer are present in the polymer emulsion in relative amounts effective to increase the elasticity of the set cement composition compared to a neat cement composition, while providing the set cement composition with a strength sufficient to seal the subterranean zone.

18. The method of claim 17 wherein the polymer emulsion further comprises at least one stiffness enhancing monomer.

19. The method of claim 17 wherein the at least one stiffness enhancing monomer is selected from the group consisting of styrene, t-butylstyrene; α-methylstyrene and sulfonated styrene.

20. A method for manipulating at least one mechanical property of a set cement composition comprising:
preparing a cement composition comprising a cementitious material, a polymer emulsion comprising the at least one polar monomer and at least one elasticity enhancing monomer, and a mixing fluid; and
allowing the cement composition to set, wherein the polar monomer and the elasticity enhancing monomer are present in the polymer emulsion in relative amounts effective to reduce the Young's modulus of the set cement composition compared to a neat cement composition, while providing the set cement composition with at least a compressive strength sufficient to seal a subterranean zone.

21. The method of claim 20 wherein the cementitious material is selected from the group consisting of Portland cement, pozzolan cement, gypsum cement, aluminous cement, silica cement, and phosphate cement.

22. The method of claim 20 wherein the at least one polar monomer is selected from the group consisting of vinylamine, vinyl acetate, acrylonitrile, acrylic acid and acid, ester, amide or salt forms of acrylates.

23. The method of claim 20 wherein the at least one elasticity enhancing monomer is selected from the group consisting of ethylene, propylene, butadiene, 1,3-hexadiene and isoprene.

24. The method of claim 20 wherein the polymer emulsion comprises from about 1 to about 90 weight percent of the at least one polar monomer and from about 10 to about 99 weight percent of the at least one elasticity enhancing monomer.

25. The method of claim 20 wherein the polymer emulsion further comprises at least one stiffness enhancing monomer.

26. The method of claim 25 wherein the at least one stiffness enhancing monomer is selected from the group consisting of styrene, t-butylstyrene, α-methylstyrene and sulfonated styrene.

27. The method of claim 25 wherein the polymer emulsion comprises up to about 70 weight percent of the at least one stiffness enhancing monomer.

28. The method of claim 20 wherein the polymer emulsion is present in an amount of from about 0.1 to about 30 percent by weight of the cementitious material.

29. The method of claim 20 wherein the mixing fluid comprises water in an amount of from about 30 to about 150 percent by weight of the cementitious material.

30. The method of claim 20 wherein the polymer emulsion is present in an amount of from about 2 to about 6 percent by weight of the cementitious material and the mixing fluid comprises water in an amount of from about 30 to about 150 percent by weight of the cementitious material.

31. The method of claim 20 wherein the polar monomer and the elasticity enhancing monomer are present in relative amounts effective to provide the set cement composition with a tensile strength sufficient to resist applied tensile stresses in the subterranean zone.

32. The method of claim 20 wherein the at least one polar monomer comprises acrylonitrile and the at least one elasticity enhancing monomer comprises butadiene.

33. A method of sealing a subterranean zone comprising:
preparing a cement composition comprising a cementitious material, a polymer emulsion, and a mixing fluid;

placing the cement composition into the subterranean zone; and allowing the cement composition to set therein, wherein the polymer emulsion comprises at least one polar monomer selected from the group consisting of vinylamine, vinyl acetate, acrylonitrile, and acid, ester, amide or salt forms of acrylates and at least one elasticity enhancing monomer, and wherein the polar monomer and the elasticity enhancing monomer are present in the polymer emulsion in relative amounts effective to increase the elasticity of the set cement composition compared to a neat cement composition, while providing the set cement composition with a strength sufficient to seal the subterranean zone.

34. The method of claim 33 wherein the cement composition further comprises at least one of silica flour, a polymer emulsion stabilizing surfactant and a defoaming agent.

35. The method of claim 33 wherein the cementitious material is selected from the group consisting of Portland cement, pozzolan cement, gypsum cement, aluminous cement, silica cement, and phosphate cement.

36. The method of claim 33 wherein the at least one elasticity enhancing monomer is selected from the group consisting of ethylene, propylene, butadiene, 1,3-hexadiene and isoprene.

37. The method of claim 33 wherein the polymer emulsion comprises from about 1 to about 90 weight percent of the at least one polar monomer and from about 10 to about 99 weight percent at the at least one elasticity enhancing monomer.

38. The method of claim 33 wherein the polymer emulsion further comprises at least one stiffness enhancing monomer.

39. The method of claim 38 wherein the at least one stiffness enhancing monomer is selected from the group consisting of styrene, t-butylstyrene, $\alpha$methylstyrene and sulfonated styrene.

40. The method of claim 38 wherein the polymer emulsion comprises up to about 70 weight percent of the at least one stiffness enhancing monomer.

41. The method of claim 33 wherein the polymer emulsion is present in an amount of from about 0.1 to about 30 percent by weight of the cementitious material.

42. The method of claim 33 wherein the polymer emulsion is present in an amount of from about 2 to about 6 percent by weight of the cementitious material and the mixing fluid comprises water in an amount of from about 30 to about 70 percent by weight of the cementitious material.

43. A method of sealing a subterranean zone comprising:

preparing a cement composition comprising a cementitious material, a polymer emulsion comprising at least one polar monomer and at least one elasticity enhancing monomer, and a mixing fluid;

placing the cement composition into the subterranean zone; and allowing the cement composition to set therein, wherein the polymer emulsion is present in an amount of from about 0.1 to about 30 percent by weight of the cementitious material;

wherein the polymer emulsion comprises from about 1 to about 90 weight percent of the at least one polar monomer and from about 10 to about 99 weight percent of the at least one elasticity enhancing monomer; and wherein the polar monomer and the elasticity enhancing monomer are present in the polymer emulsion in relative amounts effective to increase the elasticity of the set cement composition compared to a neat cement composition, while providing the set cement composition with a strength sufficient to seal the subterranean zone.

44. The method of claim 43 wherein the at least one polar monomer is selected from the group consisting of vinylamine, vinyl acetate, acrylonitrile, acrylic acid, and acid, ester, amide and salt forms of acrylates.

45. The method of claim 43 wherein the at least one elasticity enhancing monomer is selected from the group consisting of ethylene, propylene, butadiene, 1,3-hexadiene and isoprene.

46. The method of claim 43 wherein the polymer emulsion further comprises at least one stiffness enhancing monomer.

47. The method of claim 46 wherein the at least one stiffness enhancing monomer is selected from the group consisting of styrene, t-butylstyrene, $\alpha$-methylstyrene and sulfonated styrene.

48. The method of claim 47 wherein the polymer emulsion comprises up to about 70 weight percent of the at least one stiffness enhancing monomer.

49. The method of claim 43 wherein the polymer emulsion is present in an amount of from about 2 to about 6 percent by weight of the cementitious material and the mixing fluid comprises water in an amount of from about 30 to about 70 percent by weight of the cementitious material.

50. The method of claim 43 wherein the cement composition further comprises at least one of a polymer emulsion stabilizing surfactant, a defoaming agent and silica flour.

51. The method of claim 43 wherein the cementitious material is selected from the group consisting of Portland cement, pozzolan cement, gypsum cement, aluminous cement, silica cement, and phosphate cement.

* * * * *